United States Patent [19]

Teach

[11] Patent Number: 4,770,480

[45] Date of Patent: Sep. 13, 1988

[54] APPARATUS AND METHOD FOR PROVIDING MULTIPLE REFERENCE LASER BEAMS

[75] Inventor: Ted L. Teach, Dayton, Ohio

[73] Assignee: Spectra-Physics, Inc., San Jose, Calif.

[21] Appl. No.: 862,120

[22] Filed: May 12, 1986

[51] Int. Cl.[4] .................. G02B 26/10; G01B 11/26
[52] U.S. Cl. ................................ 350/6.5; 350/500;
350/286; 356/138
[58] Field of Search ........................ 350/6.5–6.8,
350/286, 500, 171; 356/132, 138, 17–19, 147,
149, 150, 399

[56] References Cited

U.S. PATENT DOCUMENTS

| | | | |
|---|---|---|---|
| 3,684,381 | 8/1972 | Zoot | 350/500 |
| 3,796,496 | 3/1974 | Appler et al. | |
| 3,966,328 | 6/1976 | Wiklund | |
| 4,031,629 | 6/1977 | Paluck | |
| 4,035,084 | 7/1977 | Ramsay | |
| 4,062,634 | 12/1977 | Rando et al. | |
| 4,519,705 | 5/1985 | Morrow | 356/138 |
| 4,676,598 | 6/1987 | Markley et al. | 350/171 |

OTHER PUBLICATIONS

Product brochure, "910 and 942 LaserLevel, Leveling and Vertical Alignment Systems for Interior and Exterior Applications".

Primary Examiner—John K. Corbin
Assistant Examiner—Loha Ben
Attorney, Agent, or Firm—Killworth, Gottman, Hagan & Schaeff

[57] ABSTRACT

Apparatus for projecting a laser beam to provide multiple reference beams includes a beam diverting assembly rotatably mounted at an end of a housing from which emerges a laser beam generated within the housing, and a pentaprism assembly disposed stationarily at the housing end outwardly of the beam diverting assembly. The beam diverting assembly receives the laser beam and splits it into orthogonally-disposed transmitted and reflected beam components. Rotation of the beam diverting assembly about the axis of the transmitted beam component causes rotation of the reflected beam component to define a reference plane. The pentaprism assembly receives the transmitted beam component from the diverting assembly and deflects it to define a stationary reference line disposed in a generally parallel spaced relationship to the reference plane defined by the rotating reflected beam component. Also, an end cap mounts the pentaprism assembly at the housing end and a sighting telescope outwardly of and adjacent to the pentaprism assembly for facilitating alignment of the reference line.

15 Claims, 2 Drawing Sheets

APPARATUS AND METHOD FOR PROVIDING MULTIPLE REFERENCE LASER BEAMS

CROSS REFERENCE TO RELATED APPLICATION

Reference is hereby made to the following copending U.S. patent application dealing with related subject matter and assigned to the assignee of the present invention: "Multiple Reference Laser Beam Apparatus" by Theodore J. Markley, Richard J. Olmor, William K. Vatter and Mark D. Sobottke, assigned U.S. Ser. No. 734,325 and filed May 15, 1985, now U.S. Pat. No. 4,676,598.

BACKGROUND OF THE INVENTION

The present invention generally relates to a method and apparatus for providing reference laser beams and, more particularly, to such a method and apparatus in which two such beams simultaneously define a reference plane and a reference line spaced above and extending generally parallel to the plane.

Laser beam systems have been employed in numerous surveying and construction applications. In one such system disclosed in U.S. Pat. No. 4,062,634, issued Dec. 12, 1977 to Rando et al, and assigned to the assignee of the present invention, a laser beam projecting apparatus provides a rotating laser beam which establishes a reference plane. The rotating laser beam is used to provide a continuous, visible plane of light that creates a constant horizontal benchmark of elevation over an entire work area. Also, one or more laser beam detectors are placed at considerable distances from the projecting apparatus for intercepting the rotating laser beam and determining elevations of selected points throughout the work area.

In the laser beam projecting apparatus of the cited patent, the generally horizontal rotating reference laser beam is produced by projecting the beam generally upward and then deflecting it ninety degrees within a pentaprism or penta-mirror assembly. The pentaprism assembly is rotated about a vertical axis within the projecting apparatus to cause the horizontal beam to rotate and define the reference plane.

It is often desired to align the plane defined by a rotating reference beam in a generally perpendicular relationship with another building structure, for example such as a wall. The multiple reference beam apparatus of the above cross-referenced application has met this need, left unfulfilled by the Rando et al apparatus, by providing both a stationary reference beam and a rotating reference beam defining a plane which is normal to the stationary beam. The apparatus of the cited application employs a beam diverting assembly of optical elements which intercept and split a primary beam into partially transmitted and partially reflected portions. The reflected portion of the beam is diverted to a path which extends generally perpendicular to the path of the transmitted beam portion. By rotating the beam diverting assembly, the reflected and diverted beam portion is rotated about an axis defined by the transmitted beam portion, whereby both a stationary reference beam, and a rotating reference beam, defining a plane normal to the stationary beam, are produced.

For the most part, the overall performance and versatility of the above-described reference beam projecting apparatuses have met and even surpassed expectations. However, from time to time gaps in their capabilities are revealed when such apparatuses are tried in new applications not originally contemplated for them. It is, therefore, seen that a need exists for expansion of the capabilities of the beam projecting apparatus of the cross-referenced application to accommodate numerous other applications, such as are typically encountered in the surveying and construction fields.

SUMMARY OF THE INVENTION

The present invention provides and apparatus and method for projecting multiple reference beams designed to satisfy the aforementioned needs. The projecting apparatus comprises: means for providing a primary light beam, first means for receiving the primary beam and outputting first and second beam components thereof disposed in a generally orthogonal relationship with respect to one another, second means for receiving and deflecting one of the beam components into a generally parallel relationship with respect to the other beam component, and drive means for rotating one of the first and second means so as to rotate one of the beam components and define a reference plane which extends generally parallel to a reference line defined by the other beam component.

More particularly, the projecting apparatus comprises: means for providing a primary light beam, first means for intercepting, splitting and deflecting the primary beam into a first transmitted beam component and a second relfected beam component, extending in a generally orthogonal relationship with respect to the first beam component, second means stationarily disposed in a position spaced from the first means for intercepting and deflecting the first beam component into a generally parallel relationship with respect to the second beam component, and drive means for rotating the first means to rotate the second beam component so as to define a reference plane which extends generally parallel to a reference line defined by the first beam component.

Still further, the projecting apparatus comprises: a housing from which a laser beam projects, a beam diverting assembly disposed at the end of the housing for receiving the laser beam and splitting it into orthogonally-disposed transmitted and reflected beam components with the diverting assembly being mounted to the housing end for rotational movement with respect thereto for causing rotation of the reflected beam component so as to thereby define a reference plane, a pentaprism assembly disposed stationarily at the end of the housing outwardly of the beam diverting assembly for receiving the transmitted beam component therefrom and deflecting it to define a reference line disposed stationarily in a generally parallel spaced relationship to the reference plane defined by the rotating reflected beam component. Also, the apparatus includes a sighting telescope for facilitating alignment of the reference line defined by the transmitted beam component.

The projecting method of the present invention comprises the steps of: providing a primary light beam, receiving the primary beam and outputting first and second beam components thereof disposed in a generally orthogonal relationship with respect to one another, receiving and deflecting one of the beam components into a generally parallel relationship with respect to the other beam component, and rotating one of the first and second beam components so as to define a reference plane which extends generally parallel to a reference line defined by the other beam component.

More particularly, the projecting method comprises the steps of: providing a primary laser beam, then intercepting, splitting and deflecting the primary beam into transmitted and reflected beam components disposed in a generally orthogonal relationship with respect to one another, intercepting and deflecting the transmitted beam component into a generally parallel relationship with respect to the reflected beam component, and rotating the reflected beam component to thereby define a reference plane which extends generally parallel to a reference line defined by the transmitted beam component.

Accordingly, it is an object of the present invention to provide a method and apparatus for projecting a stationary beam and, simultaneously, projecting a rotating beam such that the stationary beam defines a reference line and the rotating beam defines a reference plane; to provide the reference line and plane in spaced, parallel relationship to one another; to provide such parallel stationary and rotating beams from a common laser beam; and to provide means for facilitating aligning of the reference line with a desired object.

Other objects and advantages of the invention will be apparent from the following description, the accompanying drawings and the appended claims.

DETAILED DESCRIPTION OF THE PREFERRED EMBODIMENT

Figure 1:
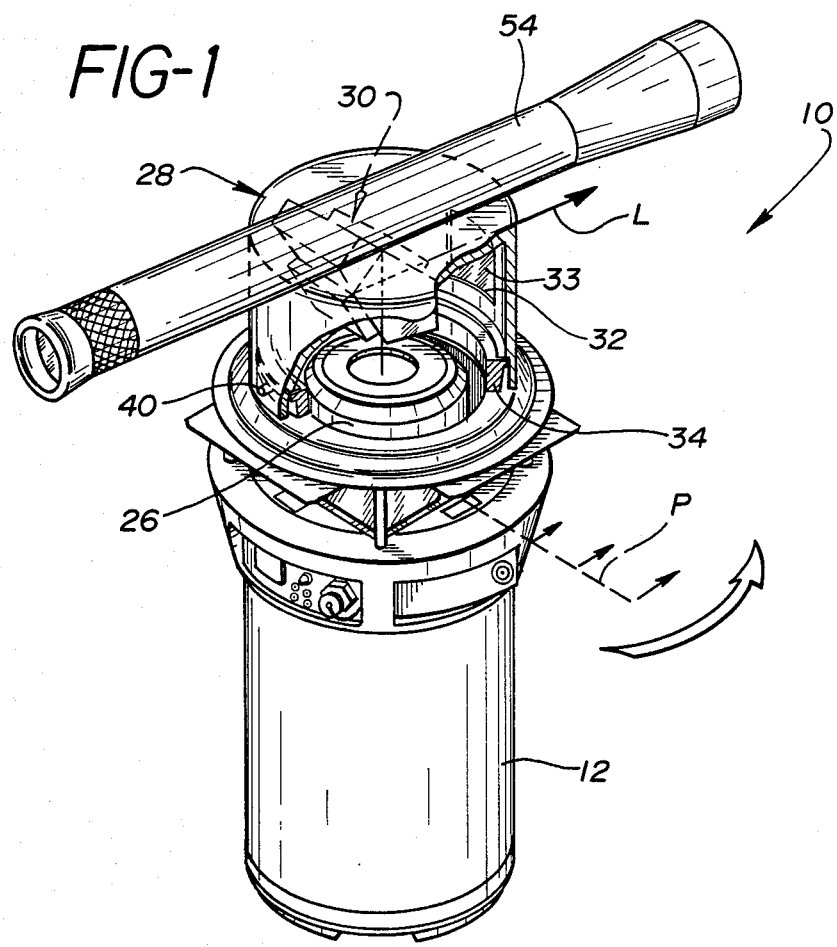
FIG. 1 is a perspective view of apparatus according to the present invention for projecting reference laser beams in the form of a rotating beam and a stationary beam spaced above and extending generally parallel to the rotating beam.
Figure 2:
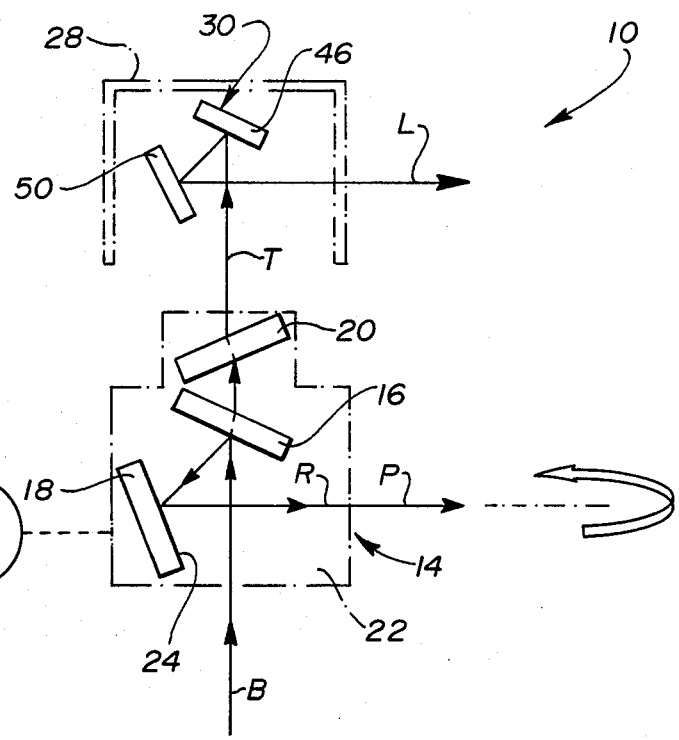
FIG. 2 is a schematic side elevational view of the arrangement of optical elements in the apparatus for projecting the reference laser beams.
Figure 3:
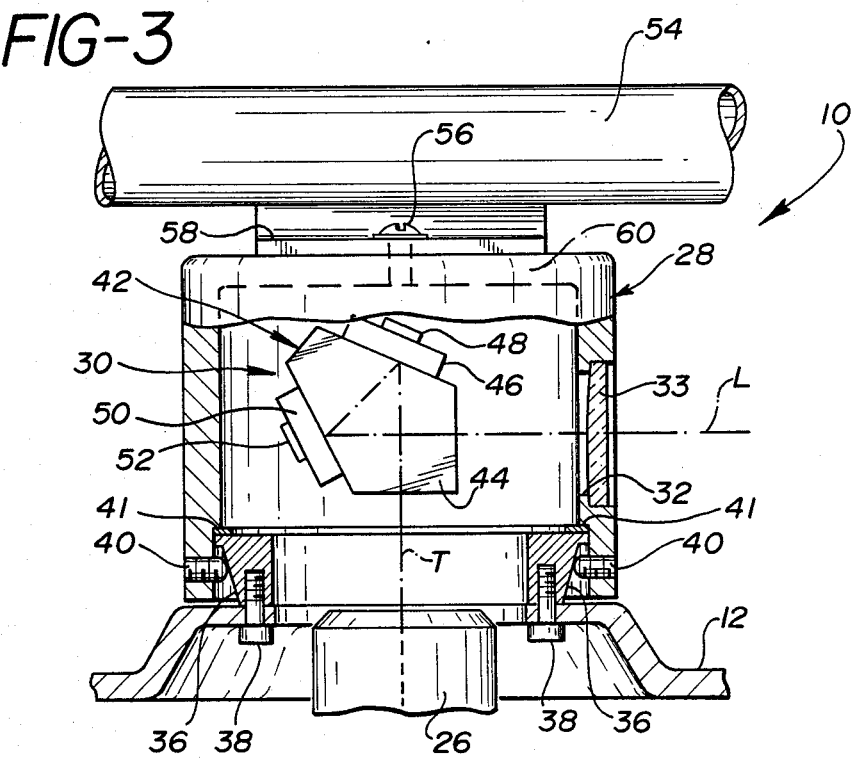
FIG. 3 is an enlarged fragmentary side elevational view, with portions broken away, of the upper end of the reference beam projecting apparatus of FIG. 1.

Reference is made to FIGS. 1-3 of the drawings which illustrate an apparatus according to the present invention, generally designated 10, for projecting simultaneously two reference laser beams. The projecting apparatus 10, except for the improvements to be described later, is generally similar to that disclosed in the above cross-referenced application, which is incorporated by reference herein. The basic components and arrangement of the apparatus 10 will be described to the extent necessary to obtain a general understanding of the apparatus so as to facilitate an appreciation of the improvements thereto provided by the present invention. A more detailed understanding of the apparatus can be gained by reference to the above-cited U.S. application, however.

The laser beam projecting apparatus 10 includes a cylindrical housing 12 which provides an enclosure for the internal components of the apparatus. A laser beam tube source and an arrangement of lenses and mirrors are mounted in a chassis (not shown) within the housing. When the housing 12 is placed in the position shown in FIG. 1, the arrangement of lenses and mirrors route the reference laser beam B, generated by the laser beam source, along a vertical axis into a beam diverting assembly, generally indicated at 14.

The laser beam diverting assembly 14 is disposed at the upper end of the housing toward which the laser beam is projected and includes an arrangement of optical elements, as shown in FIG. 2, which receive the laser beam B and ultimately split and deflect it into transmitted and reflected beam components T and R.

More specifically, the optical elements of the assembly 14 take the form of a beam splitting element 16, a lower beam deflecting element 18 and an upper beam deflecting element 20. The elements 16-20 extend between and are mounted by a pair of side plates 22, being depicted in phantom outline in FIG. 2. The beam splitting element 16 receives the laser beam B and splits it into the orthogonally-disposed transmitted and reflected beam components T and R. The reflective properties of element 16 are such that the strength of component T is approximately 60% of that of primary beam B.

The reflected beam component R of the laser beam is then received by the lower beam deflecting element 18 and reflected by a mirror surface 24 thereon in a direction which extends generally normal to the direction of the primary laser beam B. The transmitted beam component T of the laser beam is received by the upper beam deflecting element 20. The upper deflecting element 20 compensates for the slight lateral shift of the beam component T, which is produced due to refraction in the element 16, by introducing a reverse shift of the beam component as it passes through the element 20. The transmitted beam component T then passes in the same direction and along the same axis as the primary laser beam B and normal to the direction of the outputted reflected beam component R.

The beam diverting assembly 14 is mounted on the housing 12 for rotational movement by an appropriate drive means M. This causes rotation of reflected beam component R and thereby defines a reference plane P. A cylindrical rotator or holder 26 is provided to support the assembly 14 for rotation about the vertical axis of the primary laser beam B by means of a motor (not shown) mounted to the chassis. Although the reflected beam component is rotated in the illustrated embodiment, it should be understood that, optionally, the transmitted beam component T could be rotated instead.

The improvements of the present invention generally relate to a means for receiving the transmitted beam component T of the laser beam B and deflecting it into a generally parallel relationship with respect to the reflected beam component R of the laser beam, while simultaneously rotating the reflected beam R to define the reference plane P. Such means include an end cap 28 mounted on the upper end of the housing 12 and a pentaprism assembly 30, supported by the end cap 28, above the beam diverting assembly 14.

The pentaprism assembly 30 is disposed to receive the transmitted beam component T from the upper beam deflecting element 20 of the beam diverting assembly 14 and to deflect it by 90 degrees thereby defining a reference line L. Line L is disposed stationarily in a generally parallel and spaced relationship to the reference plane P defined by the rotating reflected beam component R.

The end cap 28 includes a side window 32 with a glass roundel 33 fixed therein through which the transmitted beam component T passes after being deflected by the pentaprism assembly 30. The cap 28, preferably made of aluminum, is mounted to the upper end of the housing 12 by an annular ring 34, which can also be constructed from aluminum. Ring 34 has a downwardly and inwardly tapering outer surface 36. The ring 34 is fixed to the housing by a plurality of screws 38, and the cap 28 is attached to the tapered surface 36 of the ring 34 by a plurality of screws 40, such as three nylon tip set screws disposed 120 degrees apart. Due to the tapered surface 36, cap 28 is firmly seated on phenolic washer 41.

The pentaprism assembly 30 mounted to the end cap 28 includes a pair of reflecting surfaces which are accurately aligned for deflecting the transmitted beam component T into a direction generally parallel to the reference plane P. The assembly 30 includes a frame 42 formed by a pair of upstanding sidewalls 44 (only one shown) which mount an upper mirror 46 by a support bracket 48, and a lower mirror 50 by a support bracket 52. The mirrors 46 and 50 are precisely arranged to each reflect the transmitted beam T at a nominal forty-five degree included angle so that the beam ultimately emerges from the pentaprism assembly 30 at 90 degrees from the vertical axis of the beam component T as it enters the assembly.

Finally, a sighting telescope 54 is attached by screw 56 and bracket 58 to the top 60 of the cap 28. The telescope 54 is set in alignment with the outputted transmitted beam component T which defines the reference line L, and thus can be used for aligning the beam component T.

By the present invention, a primary laser beam B is split into two beams, a stationary beam component T which defines a reference line L and a moving or rotating beam component R which rotates about the axis of the laser beam B to define a reference plane P substantially normal thereto and substantially parallel to the reference line L. Further, the end cap 28, which mounts the pentaprism assembly 30 that produces the reference line L, can readily be removed from the upper end of the housing 12 by loosening the set screws 40. Thus, the apparatus 10 can be easily converted to the configuration disclosed in the cross-referenced application, wherein the transmitted beam component defines a reference line extending generally normal to the rotating reference plane.

The apparatus of the present invention may be used in any of a number of construction applications. The dual beams produced may, for example, be used as references in conjunction with equipment which is performing a trenching operation. The stationary beam is used as a reference laterally, while the rotating beam is used as a reference to ensure that the trench has the desired depth.

Having thus described the multiple reference laser beam apparatus of the present invention in detail and by reference to a preferred embodiment thereof, it will be apparent that modifications and variations are possible without departing from the scope of the invention defined in the appended claims.

What is claimed is:

1. Apparatus for projecting a light beam to provide a plurality of reference beams, comprising:
   means for providing a primary light beam;
   first means for receiving said primary light beam and outputting first and second beam components thereof disposed in a generally orthogonal relationship with respect to one another;
   second means for receiving and deflecting one of said beam components into a generally parallel relationship with respect to the other beam component; and
   drive means for rotating only one of said first and second means thereby to rotate a corresponding one of said beam components so as to define a reference plane which extends generally parallel to a stationary reference line defined by the other beam component.

2. The apparatus of claim 1 in which said one of said first and second means is rotated by said drive means about an axis generally perpendicular to the other of said beam components.

3. The apparatus of claim 1 in which said first means includes a beam splitting element which partially reflects and partially transmits said primary beam to form said first and second beam components.

4. The apparatus of claim 3 in which said second means is disposed in spaced relation to said first means for receiving the one of said first and second beam components constituting the portion of said primary beam transmitted by said beam splitting element of said first means.

5. The apparatus of claim 3 in which said first means is rotated by said drive means, whereas said second means is stationary.

6. The apparatus of claim 1 in which said second means is a pentaprism assembly.

7. The apparatus of claim 1 further comprising:
   sighting means for facilitating alignment of said reference line defined by said other beam component.

8. Apparatus for projecting a light beam to provide a plurality of reference beams, comprising:
   means for providing a primary light beam;
   first means for intercepting, splitting and deflecting said primary beam into a first beam component and second beam component extending in a generally orthogonal relationship with respect to said first beam component;
   second means stationarily disposed in a position spaced from said first means for intercepting and deflecting said first beam component into a generally parallel relationship with respect to said second beam component; and
   drive means for rotating said first means thereby to rotate said second beam component so as to define a reference plane which extends generally parallel to a reference line defined by said first beam component.

9. The apparatus of claim 8 in which said second means is a pentaprism assembly.

10. The apparatus of claim 8 further comprising:
    sighting means for facilitating alignment of said reference line defined by said first beam component with a desired object.

11. Apparatus for projecting a laser beam to provide a plurality of reference beams, comprising:
    a housing from which a laser beam emerges through an end thereof;
    a beam diverting assembly disposed at said end of said housing for receiving said laser beam and splitting it into orthogonally-disposed transmitted and reflected beam components, said beam diverting assembly being mounted to said housing end for rotational movement with respect thereto thereby causing rotation of said reflected beam component so as to thereby define a reference plane;
    a pentaprism assembly disposed stationarily at said end of said housing outwardly of said beam diverting assembly for receiving said transmitted beam component and deflecting it to define a reference line disposed stationarily in a generally parallel spaced relationship with respect to said reference plane.

12. The apparatus of claim 11 further comprising:
a telescope for facilitating alignment of said reference line defined by said transmitted beam component with a desired object.

13. The apparatus of claim 12 further comprising:
an end cap mounting said pentaprism assembly at said end of said housing with said telescope secured thereto.

14. A method of providing a plurality of reference light beams, comprising:
providing a primary light beam;
receiving said primary beam and outputting first and second beam components thereof disposed in a generally orthogonal relationship with respect to one another;
receiving and deflecting one of said beam components into a generally parallel relationship with respect to the other beam component; and
rotating only one of said first and second beam components so as to define a reference plane which extends generally parallel to a stationary reference line defined by the other beam component.

15. A method of projecting a laser beam to provide a plurality of reference beams, comprising the steps of:
providing a primary laser beam;
intercepting, splitting and deflecting said primary beam into transmitted and reflected beam components disposed in a generally orthogonal relationship with respect to one another;
intercepting and deflecting said transmitted beam component into a generally parallel relationship with respect to said reflected beam component; and
rotating said reflected beam component to thereby define a reference plane which extends generally parallel to a stationary reference line defined by said transmitted beam component.

* * * * *